(12) United States Patent
Tiberghien et al.

(10) Patent No.: US 7,887,102 B2
(45) Date of Patent: Feb. 15, 2011

(54) QUICK COUPLING FOR JOINING TOGETHER TWO PIPES FOR CONVEYING A GAS UNDER PRESSURE

(75) Inventors: Alain-Christophe Tiberghien, Sevier (FR); Antoine Chambaud, Giez (FR); Olivier Pastore, Faverges (FR)

(73) Assignee: Staubli Faverges, Faverges (FR)

( * ) Notice: Subject to any disclaimer, the term of this patent is extended or adjusted under 35 U.S.C. 154(b) by 126 days.

(21) Appl. No.: 11/884,302

(22) PCT Filed: Mar. 1, 2006

(86) PCT No.: PCT/FR2006/000462

§ 371 (c)(1),
(2), (4) Date: Aug. 14, 2007

(87) PCT Pub. No.: WO2006/092503

PCT Pub. Date: Sep. 8, 2006

(65) Prior Publication Data

US 2008/0265574 A1 Oct. 30, 2008

(30) Foreign Application Priority Data

Mar. 2, 2005 (FR) .................................. 05 02118

(51) Int. Cl.
*F16L 37/18* (2006.01)
(52) U.S. Cl. .......................... 285/317; 285/1; 285/308; 285/924

(58) Field of Classification Search ................. 285/316, 285/924, 307, 308, 1, 317
See application file for complete search history.

(56) References Cited

U.S. PATENT DOCUMENTS

| 4,483,510 | A | * | 11/1984 | Palau et al. | ............... | 251/149.6 |
| 5,535,985 | A | * | 7/1996 | Larbuisson | .............. | 251/149.9 |
| 5,806,832 | A | * | 9/1998 | Larbuisson | .............. | 251/149.6 |
| 2003/0146623 | A1 | | 8/2003 | Lacroix | | |
| 2004/0094956 | A1 | | 5/2004 | Lacroix et al. | | |

\* cited by examiner

*Primary Examiner*—James M Hewitt
*Assistant Examiner*—Gwendolyn D Fournet
(74) *Attorney, Agent, or Firm*—Dowell & Dowell, P.C.

(57) ABSTRACT

The coupling comprises a male plug (3) and a female element (2). A retaining latch (20) for retaining the plug (5) in the female element (7) is movable between a first position in which said latch (20) is capable of retaining the plug (5) engaged to a first depth in the female element (7) in which it is connected in leaktight manner to said female element, and a second position in which said latch (20) is suitable for retaining the male plug (5) engaged to a second depth that is smaller than the first depth. The latch (20) is configured in such a manner as to be returned ($F_3$) towards the second position at least in part by positive pressure in a passage (4, 17, 26, 34) for purging the downstream pipe when the plug is at the second depth. In a variant embodiment, the coupling includes an adapter that the latch is suitable for retaining.

10 Claims, 9 Drawing Sheets

QUICK COUPLING FOR JOINING TOGETHER TWO PIPES FOR CONVEYING A GAS UNDER PRESSURE

BACKGROUND OF THE INVENTION

1. Field of the Invention

The present invention relates to a quick coupling for making a temporary junction between two pipes conveying a gas under pressure.

2. Brief Description of the Related Art

Conventionally, such a quick coupling comprises complementary male and female elements that are coupled together by engaging one in the other. The female element is generally coupled to an upstream pipe and is provided with a shutter member, which the male element moves towards an open position on being fully engaged in the female element. The male element is generally coupled to a downstream pipe. In order to ensure that during disconnection the male element is not expelled violently from the female element because of the pressure that exists in the downstream pipe, a locking mechanism for locking the male element in the female element can be designed in such a manner as to allow the male element to be fully released only after being placed temporarily in a position in which the downstream pipe is allowed to purge through the coupling. French patent application No. 1 503 989 describes such a locking mechanism, with the presence of such a mechanism in a coupling making the coupling safer to use.

Nevertheless, it can happen that while an operator is disconnecting pipes, the operator does not hold the locking mechanism long enough in its position for purging the downstream pipe, in which case the male element can still be ejected violently and dangerously from the female element.

European patent application No. 1 333 218 describes a coupling in which separation does not require one but rather two manual operations on a latch in order to reduce the risk of the male element being ejected violently. In addition to such operations being inconvenient, since they are performed successively, they also require the operator to wait, since these two operations must be separated from each other by another movement of the latch under drive from a return spring and triggered in a manner that depends on friction forces. Friction forces are themselves a function of several parameters that are difficult to control, such as the state of cleanliness of the coupling, so variation therein can lead to the unlocking operation taking place in random manner.

The invention has at least the object of further increasing the safety of quick couplings used for making a temporary junction between two pipes conveying a fluid under pressure.

To this end, the invention provides a quick coupling for making a temporary junction between upstream and downstream pipes conveying a gas under pressure, the coupling comprising a male portion and a female portion which comprises, firstly a hollow female element for receiving a male plug of the male portion, and secondly a latch for retaining a coupling element selected from the male plug and an optional adapter that is movable between a position for locking the male plug coupled in the female portion and a position for releasing the male plug, said latch being movable relative to the female element between a first position in which said latch is suitable for retaining the coupling element engaged to a first depth in the female portion and coupled in leaktight manner to said female portion, and a second position in which said latch is suitable for retaining the coupling element engaged to a second depth that is smaller than the first depth, the coupling including a passage for purging the downstream pipe to the outside when the coupling element is at the second depth, but not when the coupling element is at the first depth, the coupling being characterized in that said latch is configured in such a manner as to be returned towards its second position at least in part by positive pressure in said purge passage.

SUMMARY OF THE INVENTION

According to other characteristics of the quick coupling that are advantageous:

- the latch is slidably mounted so as to be movable in a sliding direction in a hole communicating with said purge passage;
- a first portion of the latch separates a first zone subjected to the external pressure from a second zone forming a portion of said hole and communicating with the purge passage, the first portion of the latch being disposed in such a manner as to encounter said first portion on moving away from the second zone in the travel direction of the latch from its first position towards its second position;
- a second portion of the latch separates the second zone from a third zone that is subjected to the external pressure, the second portion of the latch being offset from the first portion of the latch at least in said sliding direction in such a manner as to be on the same side of the first portion of the latch as said second zone, the cross-sectional area of the first portion of the latch being greater than the cross-sectional area of the second portion of the latch;
- the latch has a total surface that is subdivided into at least a first, a second, a third, and optionally a fourth type of surface, the surface(s) of the first type not being subjected to the pressure of the fluid in said purge passage, the surface(s) of the second type providing guidance with small clearance and sliding against the wall of said hole, the surface(s) of the third and fourth types being subjected to the pressure of the fluid in said purge passage, the or each optional surface of the fourth type differing from the surface(s) of the third type in that said pressure exerts a thrust thereon tending to move the latch from its second position towards its first position, the area of the projection of the surface of the third type or the sum of the areas of the projections of the surfaces of the third type parallel to said sliding direction onto a plane perpendicular to said sliding direction being greater than the area of the projection of any surface of the fourth type or to the sum of the areas of the projections of any surfaces of the fourth type parallel to said sliding direction onto a plane perpendicular to said sliding direction. The latch is advantageously placed in a blind hole and biased resiliently away from the end wall of the housing, with the surface(s) of the first type facing towards the opening of the housing, while any surface(s) of the fourth type face towards the end wall of the housing;
- the coupling includes a drive member for driving the latch at least towards its second position, said drive member and the latch being two distinct parts;
- the drive member is slidably mounted in the same hole as the latch, the female portion including a retaining abutment for retaining the drive member in said hole;
- the drive member includes at least one piston-forming portion separating the second zone from the third zone, said portion being subjected to the external pressure, said piston-forming portion being offset from the first portion of the latch at least in said sliding direction so as to be on the same side of said first portion of the latch as said second zone;

the latch is accessible from outside a hole in which it slides and which communicates with the purge passage;

the latch is a single piece;

the latch comprises two portions suitable for moving apart from each other under the effect of the positive pressure in the purge passage;

the coupling includes a resilient return member for returning the latch towards its first position; and an upstream portion from amongst the male and female portions includes a shutter member for shutting it, the downstream portion from amongst the male and female portions being adapted to put said shutter member in an open position when said coupling element is engaged to said first depth, and not to act on the position of said shutter member when said coupling element is at said second depth.

BRIEF DESCRIPTION OF DRAWINGS

The invention can be well understood on reading the following description given purely by way of example and made with reference to the accompanying drawings, in which:

FIG. 3A is a diagrammatic cross-section on line III-III of FIG. 3;

DESCRIPTION OF THE PREFERRED EMBODIMENT

Figure 1:
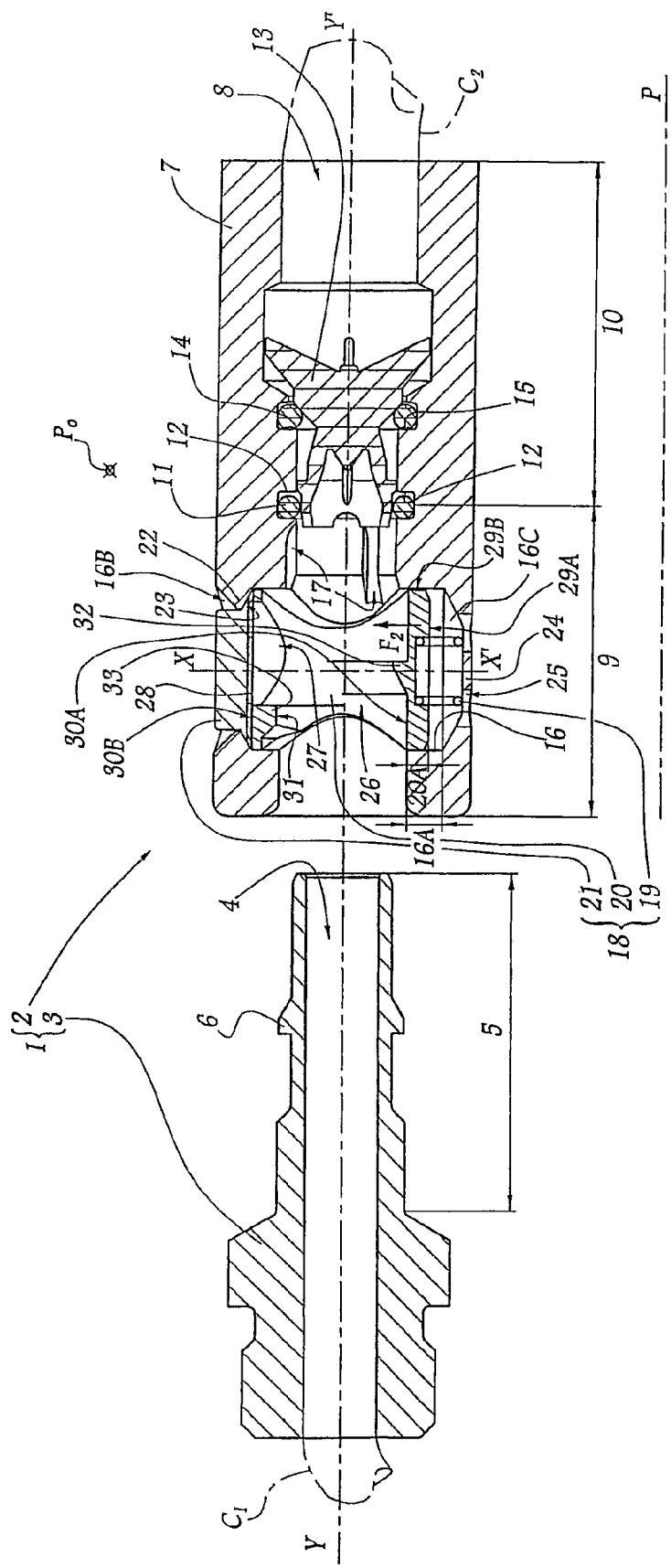
FIG. 1 is a diagrammatic axial section showing a coupling in a first embodiment of the invention in which the male and female portions of the coupling are shown separate.

FIG. 1 is a diagram showing a coupling 1 for coupling together more particularly two pipes $C_1$ and $C_2$ conveying a fluid under pressure. In the present text and in the accompanying claims, the terms "upstream" and "downstream", and other analogous terms, refer to the flow direction of the fluid under pressure through the coupling 1, this flow direction being symbolized by arrows $E_1$ in FIG. 2.

The coupling 1 of axis Y-Y' comprises a female portion 2 and a complementary male portion which is constituted by a male element 3 in the example shown.

An axial passage 4 for the fluid under pressure passes right through the male element 3 and opens out into both of its ends. Means for coupling one end of the passage 4 to the pipe $C_1$, located downstream from the coupling 1 and represented by chain-dotted lines, can be of any suitable type, and by way of example can comprise a clamping collar (not shown for the sake of clarity).

The element 3 has an end portion in the form of a plug 5. In this portion, and at a distance from its free end, the element 3 is provided with an annular collar 6.

The female portion 2 comprises a female element or body 7 having an axial hole 8 centered on the axis Y-Y' passing right through it. A portion of this hole 8 is complementary to the plug 5 and forms a housing 9 into which the plug 5 can be engaged. Another portion of the hole 8 extends the housing 9 and forms a passage 10 for the fluid under pressure. Means for coupling the opening of the passage 10 to the pipe $C_2$ that is located upstream from the coupling 1 and represented by chain-dotted lines, can be of any appropriate type, and for example can comprise a clamping collar (not shown for the sake of clarity). At the junction between the housing 9 and the passage 10, an O-ring 11 for sealing the coupling in the passage 4 and 10 is mounted in an annular groove 12.

A shutter member 13 for shutting the passage 10 is slidably mounted in the passage in known manner. It is movable between an open position and a closed position, which is the position shown in FIG. 1 in which it projects into the housing 9 and shuts the passage 10 by being pressed against an O-ring 14 mounted in an annular groove 15. In the open position shown in FIG. 2, the shutter member 13 is spaced apart from the O-ring 14.

A hole 16 extending transversely relative to the axis Y-Y' is formed in the female element 7 in such a manner as to intersect the housing 9. A plurality of axial grooves 17, three in the example shown, extend from the hole towards the passage 10 and terminate before reaching the O-ring 11.

The female element 7 is fitted with a mechanism 18 for locking the plug 5 in the housing 9. It is mounted in the hole 16 and comprises a spring 19, a latch 20, and a drive member 21 for driving the latch 20. The drive member is more specifically a pushbutton 21 for pushing the latch 20 against the force from the spring 19 in the direction shown by arrow $F_1$, representing manually-applied pressure in FIGS. 3 and 3A. The button 21 is slidably mounted in the opening 16B of the hole 16, and as a result can be driven manually towards the inside of the element 7 from outside said element 7. A narrowing 22 defines an abutment 23 for retaining the button 21 in the element 7.

The latch 20 is also slidably mounted in the hole 16, so as to be movable along the axis X-X' of the hole 16, i.e. in a manner that is substantially transversal relative to the axis Y-Y' of the housing 9 and the passage 10;

The spring 19 acts as a resilient return member urging the latch 20 towards the opening 16B, i.e. in the direction represented by arrow $F_2$ in FIG. 1. For this purpose, it is compressed between the latch 20 and an end wall 24 of the hole 16 remote from the button 21. Reference 16A designates the portion of the hole 16 in which a portion 20A of the latch 20 remote from the button 21 slides. Like a piston, the portion 20A closes the portion 16A in leaktight manner. The end wall 24 is pierced by a plurality of vents 25 putting the end zone 16C of the hole 16 into communication with the outside. This zone 16C is thus always at the external pressure $P_0$.

FIGS. 1 to 4 are diagrammatic, in particular in that for the sake of clarity the female element 7 is shown therein as being made as a single piece, whereas in reality it is constituted by assembling a plurality of parts that are separate from one another while the latch 20, the button 21, and the shutter member 13 are being installed.

A passage 26 for the plug 5 is pierced through the latch 20 and interconnects two portions of the housing 9. One of these two portions is deeper and narrower than the other. Its wall is suitable for guiding the distal end of the plug 5 and defines the axial grooves 17. One end of the hole 16 is shut by the button 21 but not by the latch 20 because a passage 27 is formed in the latch 20. At its other end, the hole 16 is indeed shut by the latch 20. The latch 20 and the button 21, which are two elements that are distinct from each other, co-operate with the wall of the hole 16 to define a chamber 28 of variable volume, with the passages 26 and 27 putting this chamber into communication with the housing 9.

The total surface of the latch 20 can be subdivided into four types of surface. The first type of surface does not come into contact with the fluid present in the housing 9. In addition, since it does not slide against the wall of the hole 16, it does not serve to guide the latch 20. In the example shown, only the end surface 29A facing the end wall 24 is of this first type. The sole surface of the second type in the example shown is pierced by the passage and is referenced 29B. This is the surface that guides the latch 20 while it is sliding in the hole 16, by sliding against the wall of the hole. The third and fourth types of surface are in contact with the fluid present in the housing 9 and they are distinguished from each other by their orientation. More precisely, the third type of surface generally faces in the direction $F_2$, i.e. towards the opening 16B and the button 21, whereas the fourth type of surface faces the other way, i.e. towards the end wall 24. In the example shown, there are two surfaces of the third type. These two surfaces are referenced 30A and 30B. The surface 30A defines the passage 26 in part, while the surface 30B defines the variable-volume chamber 28 in part. In the example shown, only one surface is of the fourth type. This surface is referenced 31. The projections of the surface 31 and the surface 30B parallel to the sliding direction X-X' of the latch, e.g. onto a plane P extending perpendicularly to said direction, both have the same area. As a result, the sum of the projections of the surfaces 30A and 30B parallel to said sliding direction X-X' onto the plane P has an area that is greater than the projection of the surface 31 parallel to said sliding direction X-X' and likewise onto the plane P.

The latch 20 is provided with two internal projections or teeth 32 and 33 for retaining the male element 3 by means of its collar 6. These projections 32 and 33 are offset from each other along the axis Y-Y'. Each of them is in the form of a collar extending over half the circumference of the passage 26. The projection 32 is offset from the projection 33 in the direction I for inserting the plug 5 into the element 7. Relative to the axis Y-Y', it is on the same side as the spring 19, while the projection 33 is on the same side as the button 21.

In FIG. 1, the female portion 2 and the male portion 3 are separate. The shutter member 13 can slide freely and the pressure of the fluid in the upstream pipe $C_2$ puts it into its downstream, shutting position. In addition, the spring 19 urges the latch 20 against the button 21, which is thus pressed against the narrowing 22.

In order to assemble the female portion 2 and the male portion 3, the plug 5 is pushed into the housing 9. While this is happening, the collar 6 snaps behind the projection 32. Once the plug 5 has been fully inserted, it has pushed the shutter member 13 upstream into its open position.

Figure 2:
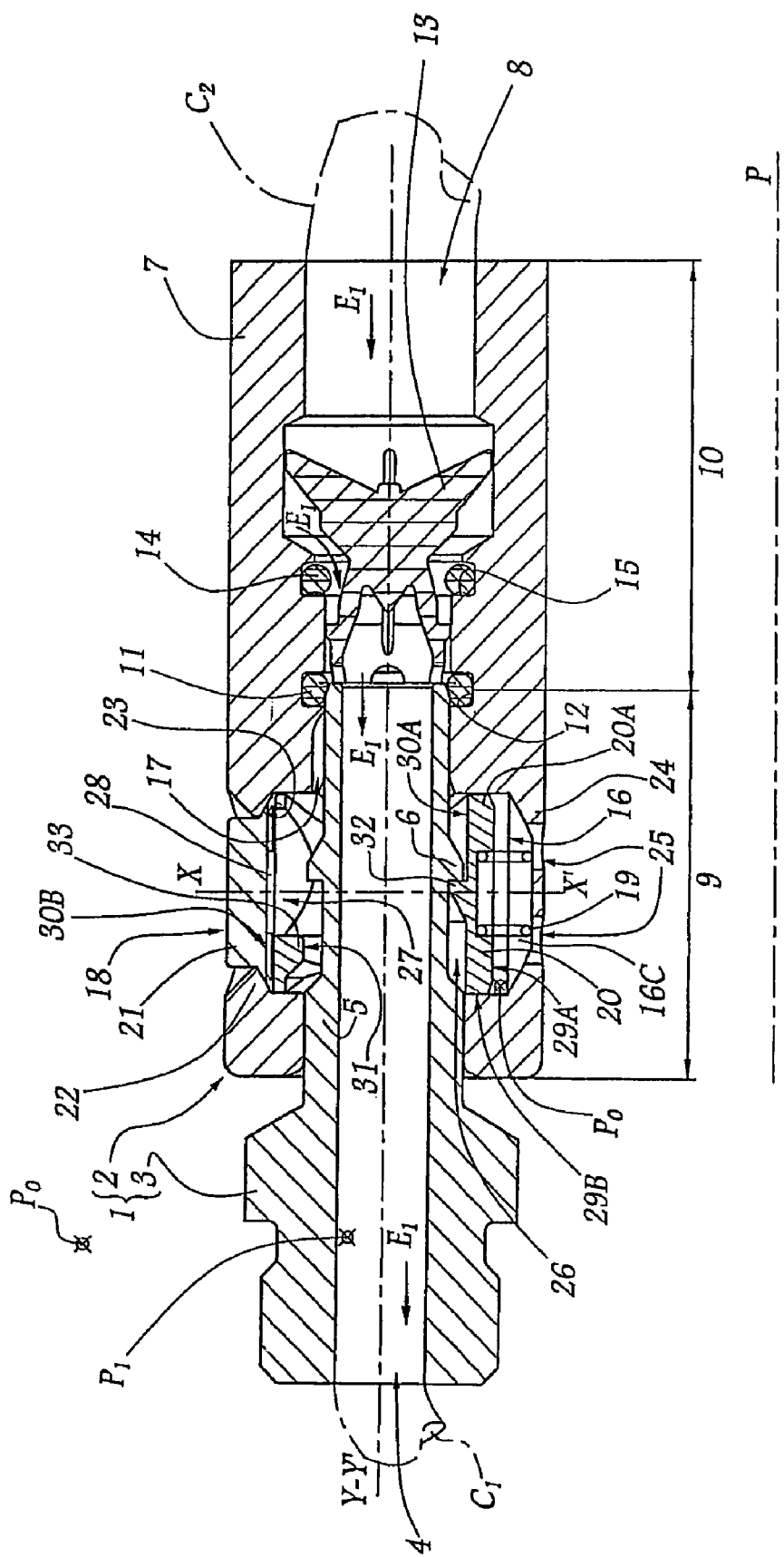
FIG. 2 is a section view analogous to FIG. 1 in which the coupling of FIG. 1 couples an upstream pipe to a downstream pipe.

In FIG. 2, the coupling 1 provides a junction between the pipes $C_1$ and $C_2$. The plug 5 is held in the housing 9 by the projection 32 engaging its collar 6, and serves to hold the shutter member 13 in its open position against the pressure $P_1$ of the fluid in the upstream pipe $C_2$. In addition, the O-ring 11 seals the coupling between the passages 4 and 10 and hermetically isolates the housing 9 from these passages 4 and 10.

In order to separate the male element 3 from the female element 2, the button 21 is pushed in the direction $F_1$ so as to move the latch 20 towards the end wall 24 far enough to enable the collar 6 to go past the projection 32, with the pressure of the fluid in the coupling 1 then causing the plug 5 to slide outwards relative to the female element 7. At this point, the coupling 1 is as shown in FIGS. 3 and 3A.

Figure 3:
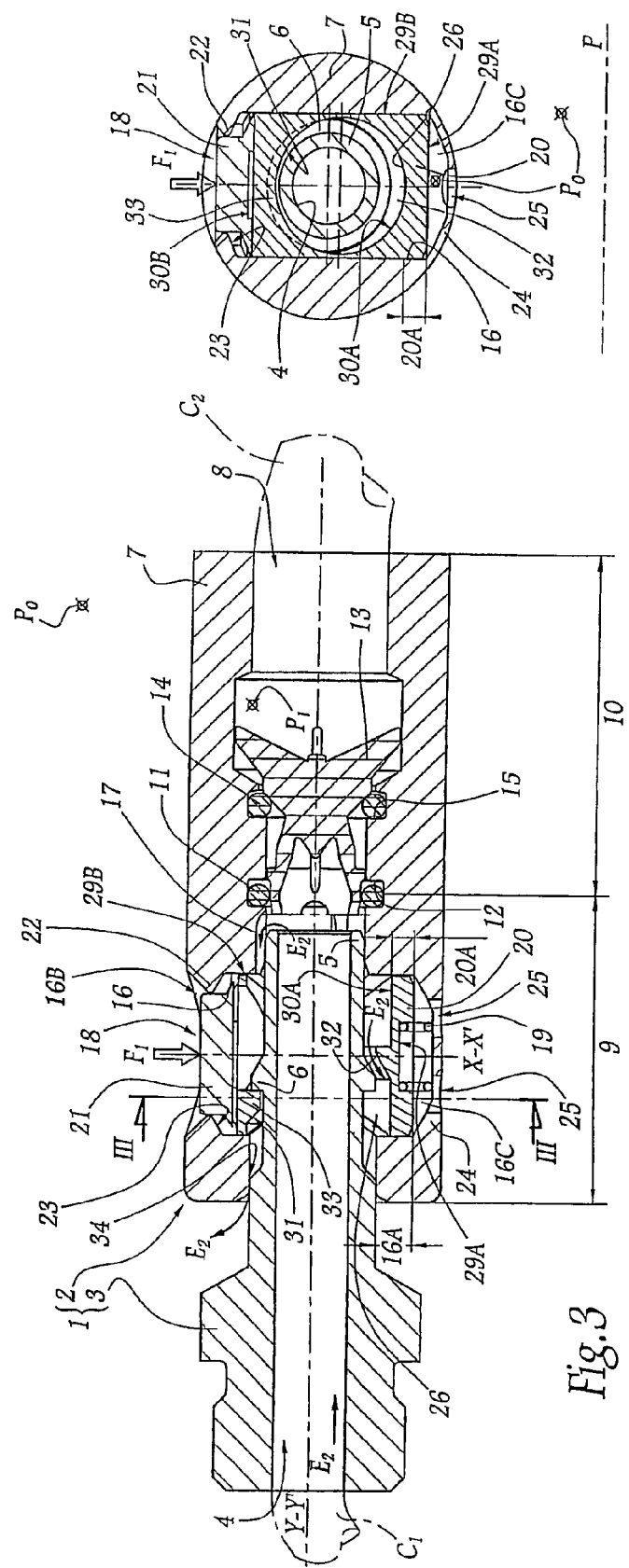
FIG. 3 is a section analogous to FIG. 1 and shows a first step in separating the male and female portions of the FIG. 1 coupling.

In FIGS. 3 and 3A, the projection 33 prevents the plug 5 from being ejected out from the element 7 by retaining the plug 5 via its collar 6. The plug 5 is engaged in the element 7 to a smaller depth than in FIG. 2, such that the shutter member 13 can shut the passage 10 and the axial grooves 17 put the passage 4 into communication with the passage 26. The downstream pipe $C_1$ is then purged, with its fluid escaping by passing via the passage 4 and then the grooves 17, followed by the passage 26, and finally through a gap 34 between the wall of the shallowest portion of the housing 9 and the plug 5, as represented by arrows $E_2$. Because the gap 34 is narrow, the head loss in the gap 34 is large. That is why, while purging $E_2$ is taking place, the pressure $P_2$ in the housing 9 and in the chamber 28 remains positive, i.e. the pressure $P_2$ is perceptibly greater than the external pressure $P_0$. The portion 20A of the latch 20 separates the zone that is subjected to the positive pressure $P_2$ from the zone at the external pressure $P_0$.

Figure 4:
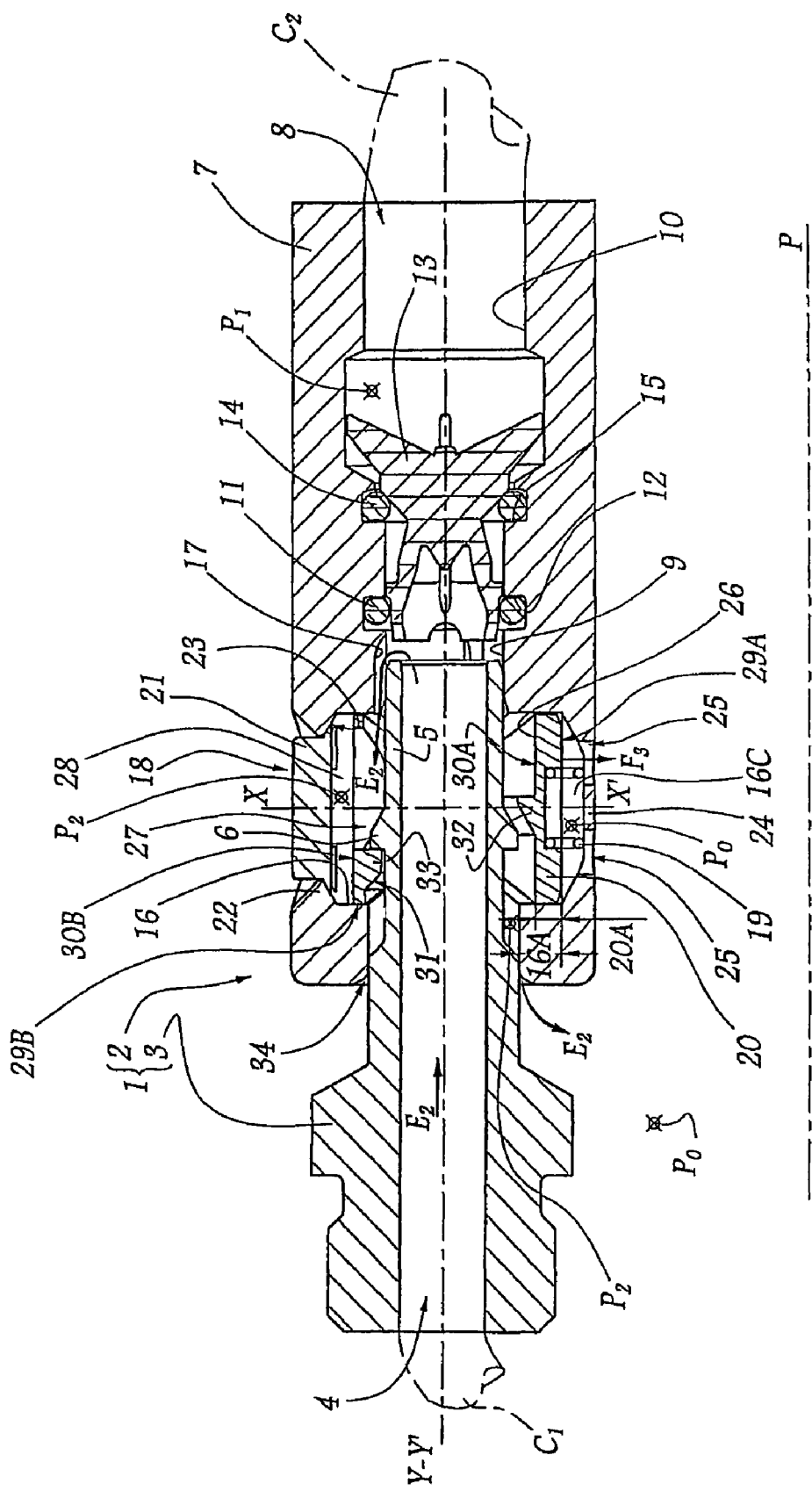
FIG. 4 is a section analogous to FIG. 1 and shows a second step in separating the male and female portions of the coupling of FIG. 1.

In FIG. 4, the downstream pipe $C_1$ continues to be purged $E_2$ without the element 3 being ejected from the element 7 even after the button 21 is no longer being pressed. This is a result of the pressure $P_2$ in the housing 9 and in the chamber 28 being greater than the pressure outside the coupling 1. This positive pressure $P_2$ acts on the surfaces 30A, 30B, and 31 of the latch 20 and exerts a force $F_3$ on the latch parallel to the sliding axis X-X', against the return force exerted by the spring 19 in the direction $F_2$, and is the result of the sum of the areas of the projections of the surfaces 30A and 30B parallel to the sliding direction X-X' onto the plane P producing a total area that is greater than the projection of the surface 31 parallel to said direction X-X' likewise onto the plane P.

In other words, the thrust that results from the application of the pressure $P_2$ on the surfaces 30B and 31 is zero, such that the latch 20 is subjected solely to the thrust that results from said pressure $P_2$ acting on the surface 30A, i.e. on the portion 20A of the latch 20, to the thrust that results from the external pressure $P_0$ being applied to the surface 29A, i.e. to said same portion 20A, and to the thrust exerted by the spring 19. The spring 19 is rated in such a manner as to be capable of urging the latch 20 in the direction $F_2$, but only once the pressure $P_2$ in the housing 9 and the chamber 28 has dropped below a predetermined threshold, such that said positive pressure can no longer lead to the element 3 being ejected violently and dangerously. Any personnel or equipment in the vicinity of the coupling 1 is thus protected, in accordance with the object of the invention.

It should be observed that unlocking the coupling 1 requires only one manual press to be applied, which constitutes an advantage.

Figure 5:
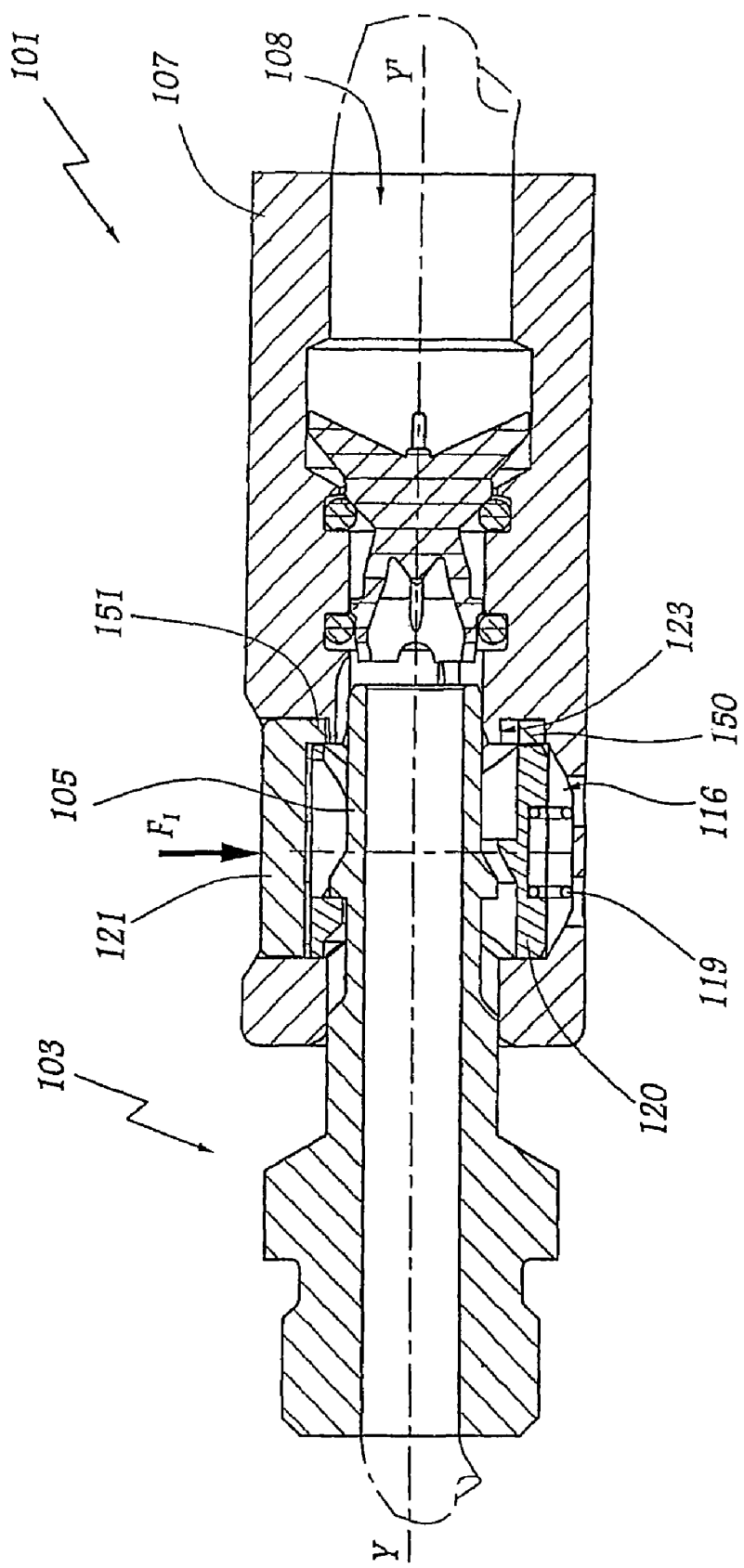
FIG. 5 is a section analogous to FIG. 1 and shows a coupling in a second embodiment of the invention, in the same step as is shown in FIG. 3.

FIG. 5 shows a coupling 101 in a second embodiment of the invention. The description below relates solely to the differences between the coupling 101 and the coupling 1. In addition, portions of the coupling 101 that are analogous or equivalent to corresponding portions of the coupling 1 are given the same references as for the coupling 1, plus 100.

The hole 116 does not have a narrowing similar to the narrowing 22. The abutment 123 is on the same side of the axis Y-Y' of the hole 108 as the spring 119. This abutment 123 presents the shape of a shoulder suitable for retaining an end portion 150 of a finger 151 fitted to the button 121.

As before, the button 121 serves to control a latch 120 for retaining the plug 105 of a male element 103 by exerting a thrust force $F_1$.

Like FIGS. 1 to 4, FIG. 5 is diagrammatic in that the female element 107 is shown therein as being a single piece.

Figure 6:
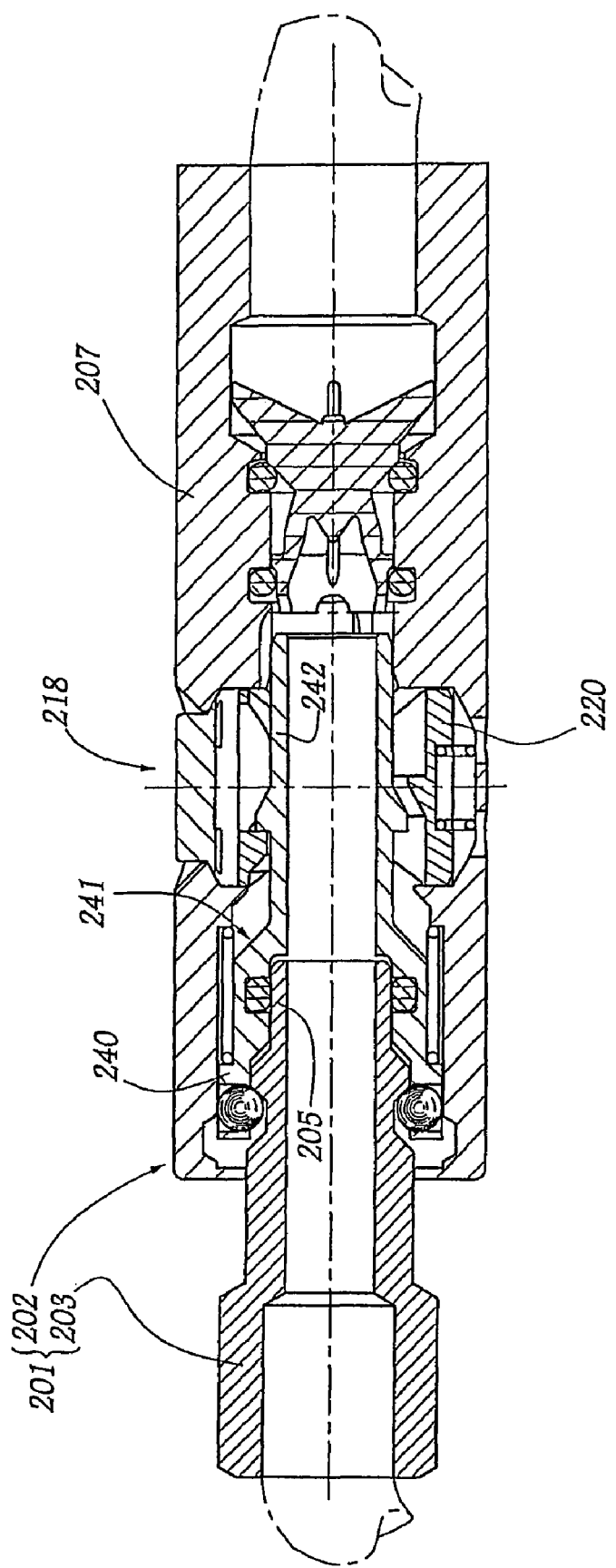
FIG. 6 is a section analogous to FIG. 3 showing a coupling in a third embodiment of the invention.

In FIG. 6, which is diagrammatic like FIGS. 1 to 5, there can be seen a coupling 201 constituting a third embodiment of the invention. This coupling 201 comprises a male portion 203 and a female portion 202 whose body 207 is fitted with an adapter 240 having the same function as the adapter described in European patent application EP 1 422 462. At its proximal end, this adapter 240 includes female means 241 for receiving and coupling with the male plug 205 of the male portion 203, whereas at its other end it defines a male plug 242. It thus constitutes a coupling element that is both male and female. The female body 207 is also fitted with a locking mechanism 218 comprising a latch 220 similar to the latch 20 and serving to lock the plug 242 of the adapter 240 at two different depths. The latch 220 operates like the latch 20.

Figure 7:
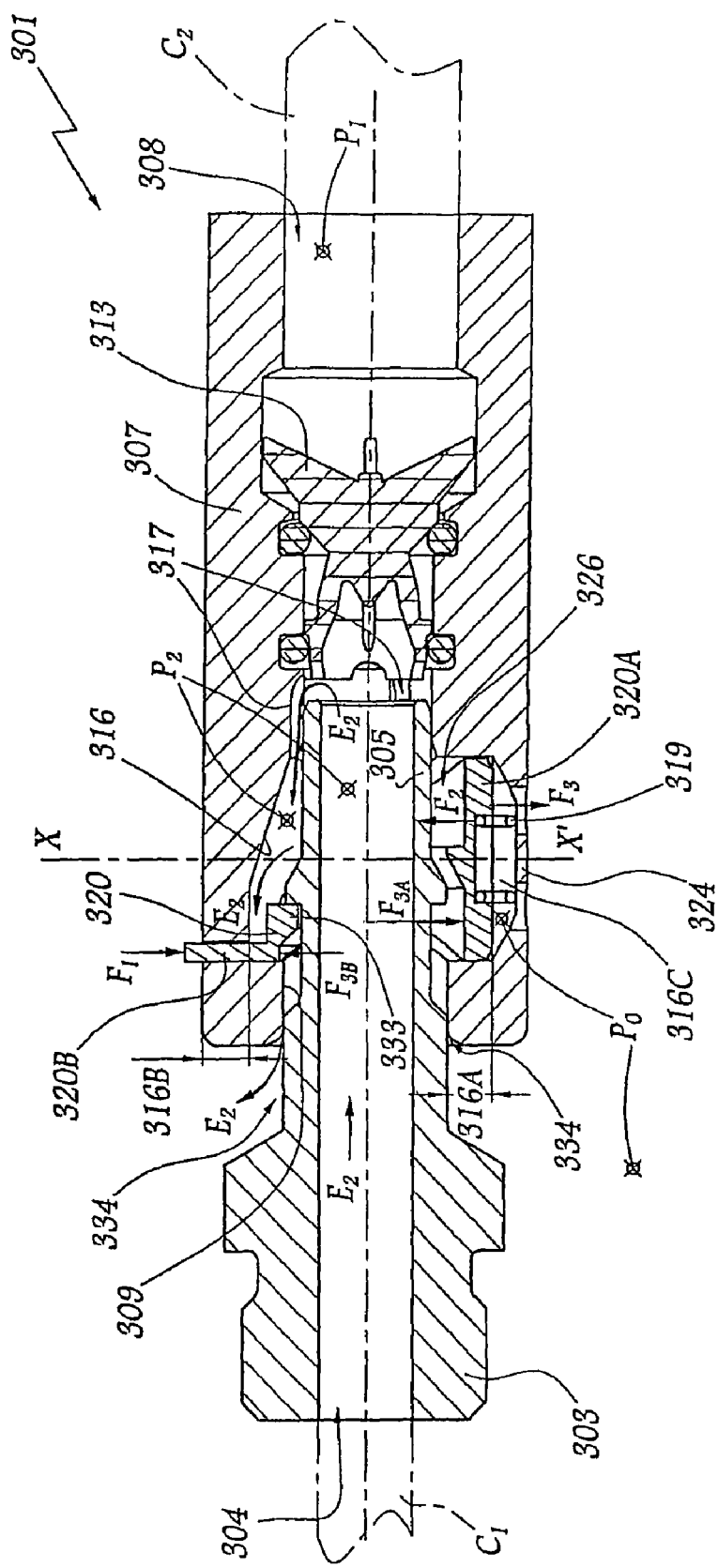
FIG. 7 is a section analogous to FIG. 3 showing a coupling in a fourth embodiment of the invention.

In FIG. 7, which is diagrammatic like FIGS. 1 to 6, there can be seen a coupling 301 constituting a fourth embodiment of the invention. Below, the description relates only to points of difference between the coupling 301 and the coupling 1. Furthermore, portions of the coupling 301 that are analogous or equivalent to portions of the coupling 1 are given references constructed by taking the references identifying said portions for the coupling 1 and adding 300.

The latch 320 comprises a single piece, but instead of having one portion closing the hole 316 in substantially leaktight manner while sliding therein like a piston, it has two such portions. One of these two portions, referenced 320A, is identical to the portion 20A of the latch 20. The other such portion of the latch 320 for shutting the hole 316 in substantially leaktight manner is referenced 320B and is located opposite from the portion 320A in the sliding direction X-X' of the latch 320. More precisely, the hole 316 has two opposite ends 316A and 316B, each having a respective one of the portions 320A and 320B sliding therein.

The portion 320A separates the central passage 326 from an end zone 316C of the hole 316 adjacent to the end wall 324, said zone 316C being at external pressure $P_0$.

The portion 320B is in the form of a rectilinear rod having a free end that forms a button projecting outside the female element 307. The latch 320 can be operated by pressing the button manually in the direction $F_1$ instead of pressing on a button of the type referenced 21. Indeed, the coupling 310 does not have a button 21.

In FIG. 7, the manual pressure $F_1$ moves the latch 320 towards the end wall 324 in such a manner that the pressure $P_1$ of the fluid previously flowing through the coupling 301 can cause the plug 305 to slide outwards relative to the female element 307.

Still with reference to FIG. 7, the projection 333 prevents the plug 305 from being ejected fully out from the element 307. This plug 305 is pushed into the element 307 to a depth such that the shutter member 313 can shut the hole 308 and the axial grooves 317 can put the passage 304 into communication with the passage 326. The downstream pipe is then purged, with fluid escaping by passing along the passage 304, then via the grooves 317, then via the passage 326, and finally through the gap 334.

Because of the head loss that exists in the gap 334, the pressure $P_2$ in the housing 309 remains positive while purging $E_2$ is taking place. The portions 320A and 320B of the latch 320 separate the zone subjected to the positive pressure $P_2$ from the zone subjected to the external pressure $P_0$. On moving in the sliding direction X-X' of the latch 320, the portion 320B is to be found on the same side relative to the portion 320A as the zone that is subjected to the positive pressure $P_2$.

The positive pressure $P_2$ exerts thrust $F_{3B}$ on the portion 320B acting in the same direction as the return force $F_2$ of the spring 319. However, on the portion 320A, this positive pressure $P_2$ exerts thrust $F_{3A}$ acting in the opposite direction to the return force $F_2$ and thus in the opposite direction to the thrust $F_{3B}$. Since the area of the cross-section 320A is greater than the area of the cross-section of the portion 320B, the thrust $F_{3B}$ is less than the thrust $F_{3A}$. Thus, the total thrust $F_3$ exerted by the positive pressure $P_2$ on the latch 320 is directed in the direction opposite to the return force $F_2$. The spring 319 is rated in such a manner that its return force $F_2$ is less than the total thrust $F_3$ so that the total thrust holds the latch 320 in the position shown in FIG. 7 until the pressure $P_2$ drops below a predetermined threshold below which said pressure can no longer lead to the element 303 being ejected violently and dangerously.

Figure 8:
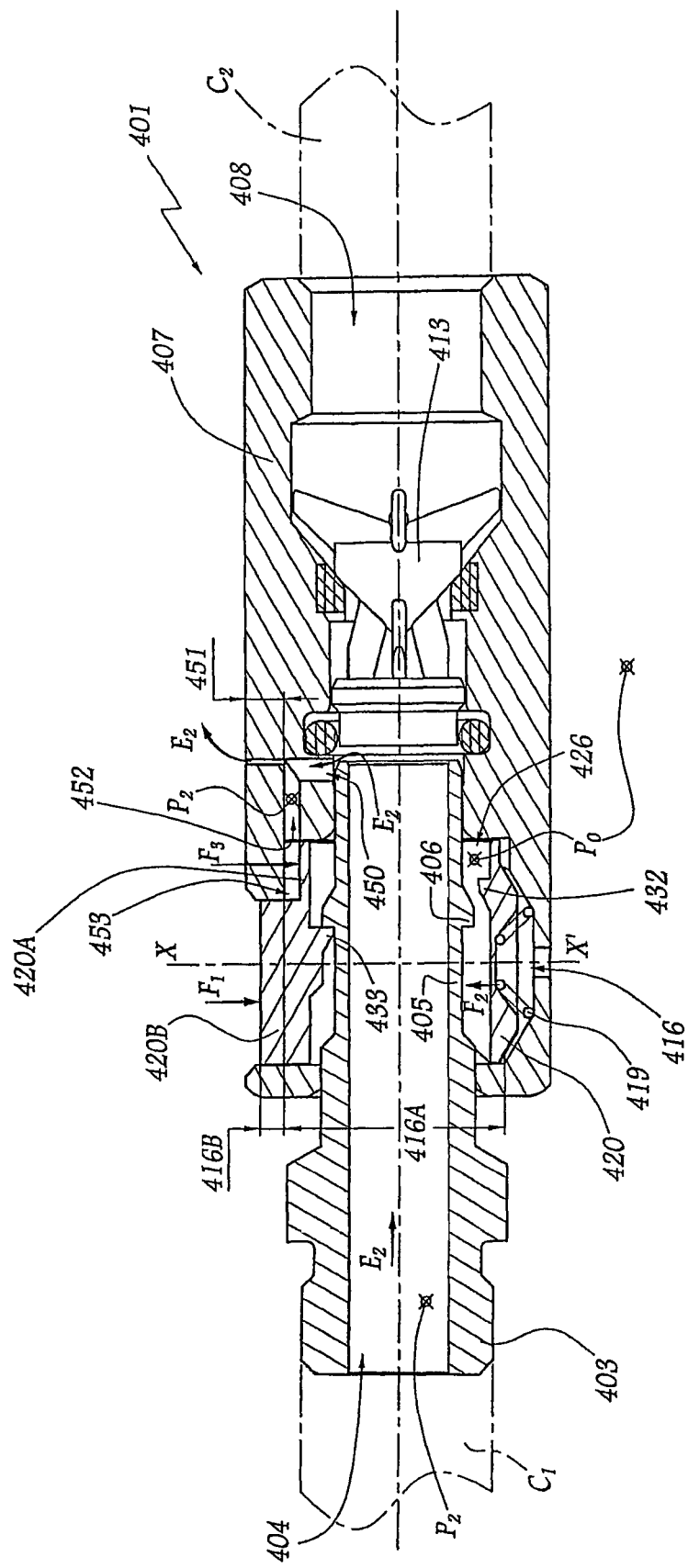
FIG. 8 is a section analogous to FIG. 3, showing a coupling in a fifth embodiment of the invention.

In FIG. 8, which is diagrammatic like FIGS. 1 to 7, there can be seen a coupling 401 constituting a fifth embodiment of the invention. The description below relates only to points of difference between the coupling 401 and the coupling 1. Furthermore, portions of the coupling 401 that are analogous or equivalent to a referenced portion of the coupling 1 are given references constructed by adding 400 to the references used for said portions of the coupling 1.

A purge passage 450 is formed in the female element 407 connecting a portion of the hole 408 to the outside, said portion being situated downstream from the shutter member 413. The purge passage 450 has a downstream portion 451 in which its flow section is significantly smaller than elsewhere. Upstream from the portion 451, a link passage 452 connects the passage 450 to the hole 416. The link passage 452 opens out more precisely at the junction of two portions 416A and 416B of the hole 416. The portion 416B is offset from the portion 416A in the sliding direction X-X' in the direction of the return force $F_2$ exerted by the spring 419. In addition, the cross-section of this portion 416B has an area that is smaller than the cross-section of the portion 416A. In the meaning used herein, the cross-sections of the portions 416A and 416B are the sections of said portions 416A and 416B in a plane perpendicular to the sliding direction X-X'.

A portion 420A of the latch 420 closes the portion 416A in substantially leaktight manner while sliding therein and being guided therein. The portion 420B of the latch 420 shuts the portion 416B in substantially leaktight manner while sliding therein. It also forms a button that is accessible from the outside and on which manual pressure $F_1$ can be exerted in order to drive the latch 420 against the return force $F_2$ exerted by the spring 419. Thus, the coupling 401 does not need to have a button of the type referenced 21, as can be seen in this figure. At the junction between the portions 420A and 420B, the latch 420 forms a shoulder 453.

In FIG. 8, the thrust $F_1$ has moved the latch 420 in such a manner that the collar 406 is separated from the projection 432, after which the pressure of the fluid that then exists in the coupling 401 has caused the plug 405 to slide outwards relative to the female element 407.

Still with reference to FIG. 8, the projection 433 retains the plug 405 via its collar 406. This plug 405 is pushed into the element 407 to a depth such that the shutter member 413 shuts the hole 408 and such that downstream from the shutter member 413 the passage 404 communicates with the purge passage 450. The downstream pipe $C_1$ is then purged, with its fluid escaping by passing via the passage 404, then via the purge passage 450, but not via the passage 426.

Because of the small flow section of the downstream portion 451, the head loss in the downstream portion 451 is large. That is why during purging $E_2$, the pressure $P_2$ in the passage 452 remains positive. This positive pressure $P_2$ acts on the shoulder 453 exerting thrust $F_3$ thereon parallel to the sliding axis X-X' and against the return force $F_2$ exerted by the spring 419. This spring 419 is rated in such a manner as to be capable of returning the latch 420, but only once the pressure $P_2$ has dropped below a predetermined threshold, below which the pressure can no longer lead to the male element 403 being ejected violently and dangerously. It should be observed that the pressure $P_2$ normally does not act in the passage 426 which is at the external pressure $P_0$, but in which the pressure can nevertheless become high without the normal operation of the coupling 401 being affected thereby.

Figure 9:
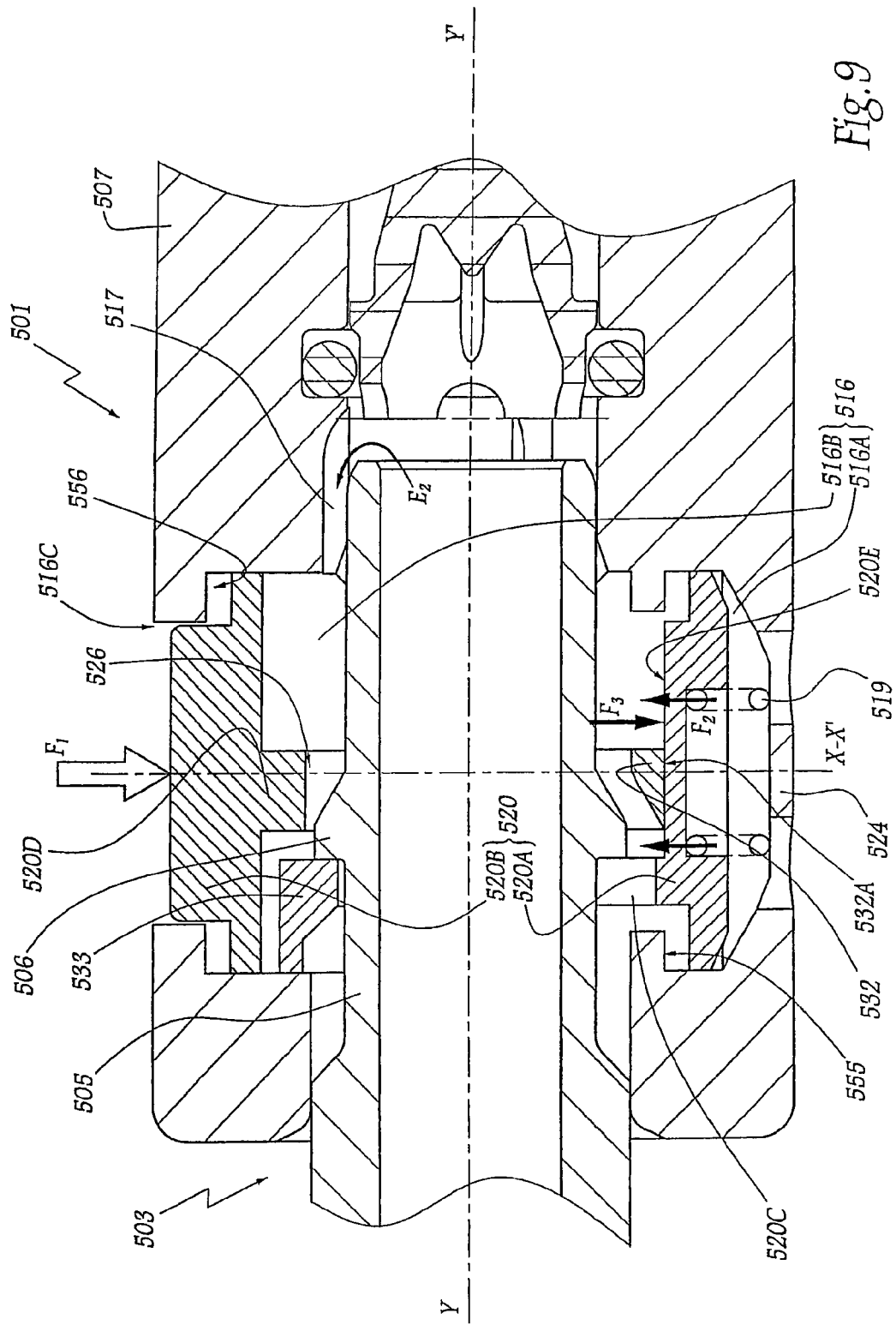
FIG. 9 is a section analogous to FIG. 3 but fragmentary and on a larger scale, showing a coupling in a sixth embodiment of the invention.

In FIG. 9, which is diagrammatic like the preceding figures, there can be seen part of a coupling 501 constituting a sixth embodiment of the invention. Below, the description relates only to the differences between the coupling 501 and the coupling 1. In addition, portions of the coupling 501 that are analogous or equivalent to referenced portions of the coupling 1 are given references that are constructed by adding 500 to the reference identifying the corresponding portion of the coupling 1.

A hole 516 is formed in the female element 507 of the coupling 501, said hole extending along a direction X-X' perpendicular to the longitudinal axis Y-Y' of the element 507, which is drawn as being a single piece but which could be made up of a plurality of parts. The plug 505 of a male element 503 is held in position in the female element 507 by means of a latch 520 that is slidable in the hole 516. The latch 520 comprises two distinct portions 520A and 520B.

The portion 520A shuts in substantially leaktight manner a portion 516A of the hole 516 that is situated in the vicinity of the end wall 524 of said hole. The portion 520A is held in the portion 516A of the hole 516 by two shoulders 555 formed by the body of the element 507. The portion 520A carries an annular extension 520C through which the plug 505 can pass and in which the portion furthest away from the end wall 524 forms a retaining portion 533 suitable for bearing against an outer collar 506 on the plug 505.

The portion 520B slides in substantially leaktight manner in a portion 516B of the hole 516 that is situated in the vicinity of its opening 516C. The portion 520B is held in position in the orifice 516 by two shoulders 556 formed in the vicinity of the opening 516C. The portion 520B is provided with an annular extension 520D that extends towards the portion 520A and that has the plug 505 passing therethrough. The extension 520D forms a retaining portion 532 that interacts with the collar 506 when the coupling 501 is in a fully engaged configuration corresponding to that shown in FIG. 2 for the coupling 1 constituting the first embodiment.

The surface 532A of the portion 532 that is furthest from the main portion of the portion 520B is designed to bear against the surface 520E of the portion 520A that is remote from the end wall 524. Thus, a thrust force $F_1$ exerted on the surface of the portion 520B that is accessible from outside the hole 526 can be transmitted to the portion 520A against a resilient force $F_2$ exerted by a spring 519 interposed between the portion 520A and the end wall 524.

In the configuration of FIG. 9, when the force $F_1$ is exerted, the tooth 532 is retracted towards the end wall 524, thus enabling the plug 505 to be withdrawn in part from the element 507. The plug 505 then presses via its collar 506 against the portion 533. The fluid present in the pipe connected to the male element 503 can then flow as represented by arrow $E_2$ in FIG. 2, said flow passing via grooves 517 analogous to the grooves 17 of the first embodiment, to reach a passage 526 analogous to the passage 26 of the first embodiment and defined between the portions 520A and 520B. The positive pressure $P_2$ that then exists in the chamber defined between the portions 520A and 520B has the effect of urging the portion 520A towards the end wall 524 against the force $F_2$, and of urging the portion 520B remote from the end wall 524 towards the shoulders 556.

The positive pressure $P_2$ is the result of fluid accumulating in the volume of the grooves 517 and the passage 526. This positive pressure acts in particular on the surface 520E of the portion 520B which is thus subjected to a thrust force $F_3$ towards the end wall 524. The portion 533 which is secured to the portion 520B is thus returned towards a position in which it is on the path for withdrawing the collar 506 from the element 507.

Under the effect of the pressure $P_2$, the portions 520A and 520B tend to move apart from each other.

So long as the pressure $P_2$ remains greater than a predetermined value, which depends on the stiffness constant of the spring 519, the portion 520A remains pressed towards the end wall 524 by the force $F_3$ so that the portion 533 is effective in opposing any withdrawal of the plug 505.

Because of leaks around the portions 520A and 520B and the plug 505, the pressure $P_2$ diminishes progressively and the force $F_2$ finally overcomes the force $F_3$, thereby pushing back the portion 520A and the portion 533 towards the opening 516C, and thus releasing the plug 505.

The technical characteristics of the various embodiments described above may be combined in the context of the present invention.

The invention claimed is:

1. A quick coupling for making a temporary junction between an upstream pipe and a downstream pipe conveying a gas under pressure, the coupling comprising a male portion and a female portion which comprises, a hollow female element for receiving a male plug of the male portion, a latch for retaining in two distinct positions a coupling element selected from the male plug and an optional adapter that is movable between a position for locking the male plug coupled in the female portion and a position for releasing the male plug, and a resilient return member for driving said latch, said latch being movable in a single manual operation against the action of said resilient return member relative to the female element between a first position in which said latch is suitable for retaining the coupling element engaged to a first depth in the female portion and coupled in leak tight manner to said female portion so that gas flows from said upstream pipe to said downstream pipe, and a second position different from said first position in which said latch is suitable for retaining the coupling element engaged to a second depth that is smaller than the first depth, the coupling including a passage for purging the downstream pipe to the outside when the coupling element is at the second depth, but not when the coupling element is at the first depth, wherein said latch is configured in such a manner as to be held in its second position at least in part by positive pressure in said purge passage against the action of said resilient return member; and a drive member for driving the latch at least towards its second position, said drive member and the latch being two distinct parts, wherein said drive member is slidably mounted in the same hole as the latch, the female portion including a retaining abutment for retaining the drive member in said hole.

2. A coupling according to claim 1, wherein the latch is slidably mounted so as to be movable in a sliding direction in the hole which communicates with said purge passage.

3. A coupling according to claim 2, wherein a first portion of the latch separates a first zone subjected to the external pressure from a second zone forming a portion of said hole and communicating with the purge passage, the first portion of the latch being positioned between the second zone and the first zone such that the gas under pressure encounters said first portion of the latch on moving away from the second zone in the travel direction of the latch from its first position towards its second position.

4. A coupling according to claim 3, wherein a second portion of the latch separates the second zone from a third zone that is subjected to the external pressure, the second portion of the latch being offset from the first portion of the latch at least in said sliding direction in such a manner as to be on the same side of the first portion of the latch as said second zone, the cross-sectional area of the first portion of the latch being greater than the cross-sectional area of the second portion of the latch.

5. A coupling according to claim 2, wherein the latch has a total surface that is subdivided into at least a first, a second, a third, and optionally a fourth type of surface, the surface(s) of the first type not being subjected to the pressure of the fluid in said purge passage, the surface(s) of the second type providing guidance with small clearance and sliding against the wall of said hole, the surface(s) of the third and fourth types being subjected to the pressure of the fluid in said purge passage, the or each optional surface of the fourth type differing from the surface(s) of the third type in that said pressure exerts a thrust thereon tending to move the latch from its second position towards its first position, the area of the projection of the surface of the third type or the sum of the areas of the projections of the surfaces of the third type parallel to said sliding direction onto a plane perpendicular to said sliding direction being greater than the area of the projection of any surface of the fourth type or to the sum of the areas of the projections of any surfaces of the fourth type parallel to said sliding direction onto a plane perpendicular to said sliding direction.

6. A coupling according to claim 2, wherein said drive member includes at least one piston-forming portion separating the second zone from the third zone, said portion being subjected to the external pressure, said piston-forming portion being offset from the first portion of the latch at least in said sliding direction so as to be on the same side of said first portion of the latch as said second zone.

7. A coupling according to claim 1, wherein said latch is accessible from outside a hole in which it slides and which communicates with said purge passage.

8. A coupling according to claim 7, wherein said latch is a single piece.

9. A coupling according to claim 7, wherein said latch comprises two portions suitable for moving apart from each other under the effect of said positive pressure in said purge passage.

10. A coupling according to claim 1, wherein an upstream portion from amongst the male and female portions includes a shutter member for shutting it, the downstream portion from amongst the male and female portions being adapted to put said shutter member in an open position when said coupling element is engaged to said first depth, and not to act on the position of said shutter member when said coupling element is at said second depth.

* * * * *

UNITED STATES PATENT AND TRADEMARK OFFICE
CERTIFICATE OF CORRECTION

| | | |
|---|---|---|
| PATENT NO. | : 7,887,102 B2 | |
| APPLICATION NO. | : 11/884302 | |
| DATED | : February 15, 2011 | |
| INVENTOR(S) | : Tiberghien et al. | |

It is certified that error appears in the above-identified patent and that said Letters Patent is hereby corrected as shown below:

On the title page item (75),

Please correct the residence city of applicant Alain-Christophe Tiberghien as indicated below:

"Sevrier", FRANCE

Signed and Sealed this
Seventh Day of June, 2011

David J. Kappos
*Director of the United States Patent and Trademark Office*